May 27, 1930.                T. L. RYERSON                1,760,375
                             LAWN SPRINKLER
                            Filed May 4, 1927
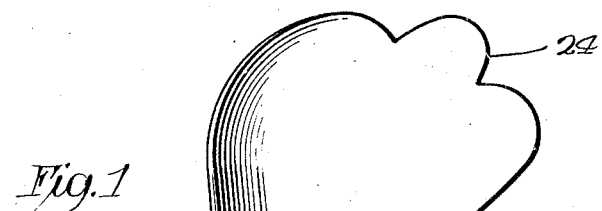
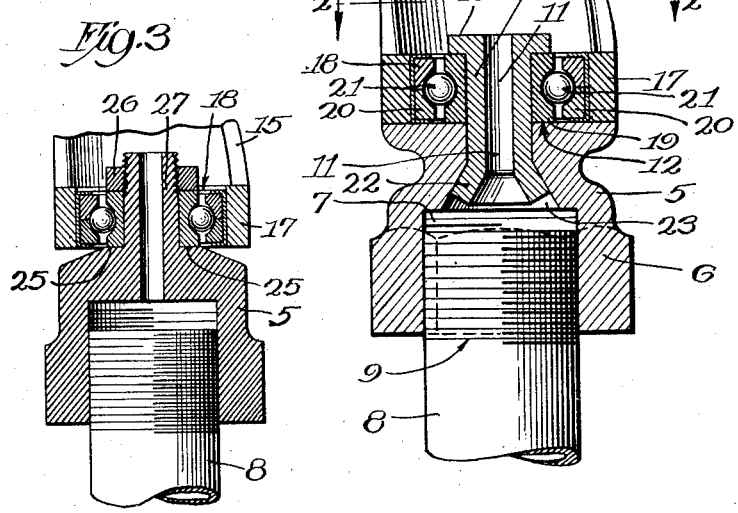
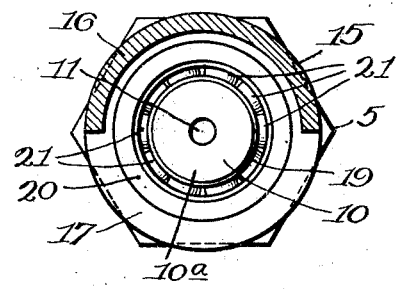
Inventor:
Thorval L. Ryerson
By Fisher, Towle, Clapp & Soans Attys.

Patented May 27, 1930

1,760,375

UNITED STATES PATENT OFFICE

THORVAL L. RYERSON, OF PARK RIDGE, ILLINOIS, ASSIGNOR TO W. D. ALLEN MANUFACTURING COMPANY, OF CHICAGO, ILLINOIS, A CORPORATION OF ILLINOIS

LAWN SPRINKLER

Application filed May 4, 1927. Serial No. 188,631.

This invention relates to lawn sprinklers, and particularly to lawn sprinklers of the type having a stationary nozzle portion and a rotatable sprayer portion adapted to be rotated as an incident to the discharge of water or other fluid from the nozzle.

The object of the invention is to provide a simply constructed device of the class described, which will be efficient in operation and low in cost of manufacture. Other objects and the advantages of the invention will be understood when reference is had to the following specification and accompanying drawing in which I have illustrated a selected embodiment of my invention and in which:

Figure 1 is a section through the axis of the nozzle portion of a device constructed according to my invention.

Figure 2 is a section on the line 2—2 of Figure 1, and

Figure 3 is a section through the axis of the nozzle portion of a device also constructed according to the invention but embodying another form thereof.

Referring now to the drawings, I have indicated at 5 a nozzle member having a coupling portion 6 provided with internal threads indicated at 7 whereby the nozzle member is adapted to be connected to a stand pipe or the like, indicated at 8, and provided with threads 9 adapted to engage the said internal threads 7. This nozzle member 5 is also provided with a shoulder or seat 12 adjacent its upper end for a purpose which will presently appear.

A cylindrical or round outlet part 10, of relatively small diameter, projects upwardly from the nozzle and is provided with a laterally projecting annular flange 10ª adjacent its upper end and spaced from said seat 12. This outlet part is also provided with a relatively restricted discharge opening 11 extending therethrough and communicating with the inside of said coupling portion.

A sprayer member 15 having a blade portion 16 and an annular bottom portion 17 is rotatably supported relative to the nozzle member 5 by means of a single anti-friction bearing member 18. The bearing member 18 comprises an inner race 19, an outer race 20 and a plurality of ball bearings 21 interposed between the races. The inner race 19 of the bearing is axially apertured and disposed between the seat 12 and the annular flange 10ª, and around the projecting outlet portion 10 in which position the bearing may be locked or maintained. In the present embodiment of my invention, I prefer to swage the lower end of the said outlet part 10 outwardly, as indicated at 22, to lie closely adjacent the inclined face of a conical recess 23, whereby the outlet part is locked in place and the inner race of the bearing member permanently locked between said seat and flange. It will, of course, be understood that one race of the bearing will be mounted and permanently locked in place with respect to the other race by the ball bearings interposed therebetween, in a well known manner.

The sprayer member may be mounted on the outer race 20 of the bearing member in any suitable manner. In the present instance, I prefer to mount the sprayer member by providing the above mentioned annular bottom portion 17 with a bore having an internal diameter which will be a snug or frictionally holding fit over the outside diameter of the outer race 20.

The blade portion 16 of the sprayer member is so formed and arranged that it will intercept a stream of water discharged through said outlet opening 11 and will thereby be caused to rotate, the irregular end 24 being effective to break up the stream into a relatively fine spray and to distribute the same in all directions about the nozzle.

I have found in practice that the ordinary radial type of ball bearing such as is a standard product of many manufacturers, will efficiently serve the purpose of the bearing in my improved sprinkler as above described. I have found that endwise thrust in an upward direction on the sprayer member, due to the force of a stream of water striking the same, is sufficient to lift the sprayer member off the seat 12 so as to avoid excessive frictional engagement therewith when in operation, but is not so great as to require the provision of special means or of a special type of combination radial and end thrust ball bearing which would obviously be considerably more expensive than the above described simple type of radial bearing. The above described structure can be manufactured very economically and consequently sold at a relatively low price and a sprinkler embodying the features above described is very efficient since the rotating sprayer member requires comparatively low water pressure to operate the same.

In Figure 3, I have illustrated a modified construction wherein the inner race of the ball bearing is clamped between a seat 25 and a nut 26, which nut threadedly engages the upper end of an outlet part 27 which is integral with the nozzle member, as shown. This construction has certain advantages over the first described form but is within the spirit of the invention as will be apparent to those skilled in the art.

I am aware that other sprinkler constructions embodying the advantages of the above described structures may be devised without departing from the spirit of the invention, the scope of which should be determined by reference to the following claim, wherefore the same should be construed as broadly as possible, consistent with the state of the art.

I claim as my invention:

In a lawn sprinkler, the combination of a nozzle member having a coupling portion for connecting the nozzle to a stand pipe or the like, an outlet aperture and a seat adjacent its upper end, an anti-friction bearing member comprising inner and outer races, and a plurality of ball bearings interposed there-between, the inner of said races being axially apertured and disposed against said seat, means for locking said inner race to said nozzle member comprising a tubular outlet part disposed in said aperture and having a laterally, outwardly extending flange adjacent its upper end overlying said inner race, the inner end of said outlet part being swaged outwardly on the inside of said coupling part so as to lock the outlet part to the nozzle member, and a sprayer member including a blade portion and an annular bottom portion fitting snugly over said outer race, whereby the sprayer is rotatably supported relative to said nozzle member by said bearing member, said blade being formed and arranged so as to intercept a stream of fluid discharged from said nozzle and thereby to be rotated.

THORVAL L. RYERSON.